(12) United States Patent
Mino (10) Patent No.: US 7,586,763 B2
(45) Date of Patent: Sep. 8, 2009

(54) ELECTRIC POWER CONVERTER CIRCUIT

(75) Inventor: Kazuaki Mino, Hino (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 203 days.

(21) Appl. No.: 11/519,075

(22) Filed: Sep. 12, 2006

(65) Prior Publication Data

US 2007/0070656 A1    Mar. 29, 2007

(30) Foreign Application Priority Data

Sep. 29, 2005    (JP) .............................. 2005-283756

(51) Int. Cl.
*H02M 5/45*    (2006.01)
(52) U.S. Cl. .............................. 363/37; 363/40; 363/98; 363/132
(58) Field of Classification Search ................... 363/37, 363/40, 67, 69, 71, 98, 132, 34
See application file for complete search history.

(56) References Cited

U.S. PATENT DOCUMENTS

| | | | |
|---|---|---|---|
| 6,256,209 B1 * | 7/2001 | Gurwicz et al. ............... 363/17 |
| 6,297,973 B1 * | 10/2001 | Jian-Ping et al. .............. 363/37 |
| 6,927,985 B2 * | 8/2005 | Klinkowstein ............... 363/17 |
| 7,054,737 B2 * | 5/2006 | Degner et al. ................ 701/115 |
| RE39,926 E  * | 11/2007 | Morimoto et al. ............. 363/17 |
| 2005/0068796 A1 | 3/2005 | Morita |

* cited by examiner

*Primary Examiner*—Jessica Han
*Assistant Examiner*—Emily Pham
(74) *Attorney, Agent, or Firm*—Manabu Kanesaka

(57) ABSTRACT

An electric power converter circuit includes a rectifying circuit having diodes, a coil, and a full-bridge circuit including switching devices, which are connected in cascade to an AC power supply 1, to convert an AC to a DC and to further convert the concerted DC to an AC. The converter circuit further includes a series circuit having a capacitor and a switching device, and connected between the DC terminals of the full-bridge circuit. One of the switching devices on the upper arm and one of the switching devices on the lower arm are turned simultaneously ON for a certain period of time. The electric power converter circuit facilitates reducing the number of the constituent parts, size, weight and manufacturing costs thereof.

12 Claims, 7 Drawing Sheets

Prior Art

ELECTRIC POWER CONVERTER CIRCUIT

BACKGROUND OF THE INVENTION AND RELATED ART STATEMENT

The present invention relates to an electric power converter circuit including an AC to DC converter circuit for improving the input power factor and for suppressing higher harmonics, and a DC to AC converter circuit for performing DC to AC conversion.

Figure 6:
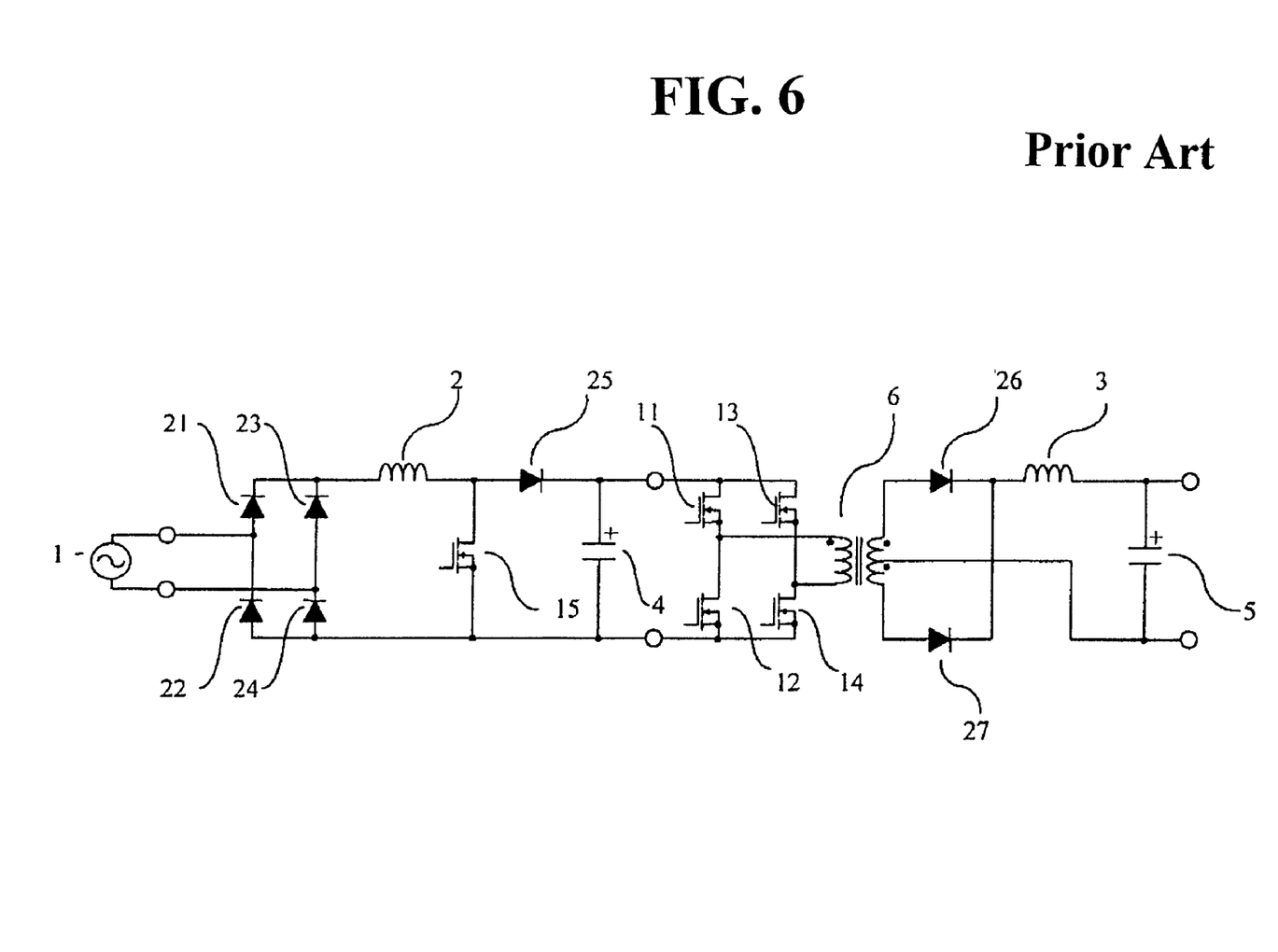
FIG. 6 is a block circuit diagram of a conventional electric power converter circuit including an AC to DC converter circuit and a DC to AC converter circuit.
Figure 7:
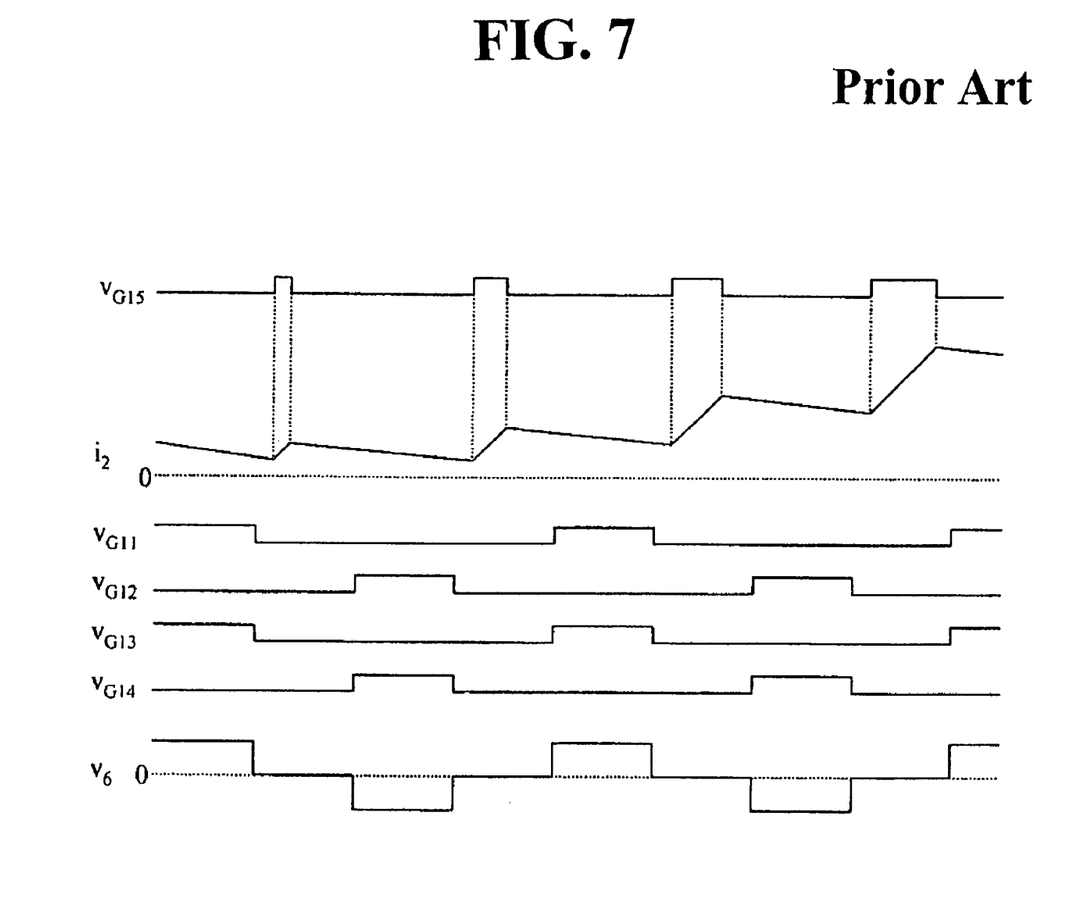
FIG. 7 is a wave chart describing the operations of the conventional electric power converter circuit shown in FIG. 6.

FIG. 6 is a block circuit diagram of a conventional electric power converter circuit including a power factor improving circuit as described in Japanese Patent Publication No. 2005-110434 and a DC to AC converter circuit. FIG. 7 is a wave chart describing the operations of the conventional electric power converter circuit.

In FIG. 6, an AC power supply 1, coils 2, 3, capacitors 4, 5, a transformer 6, switching devices 11 through 15, and diodes 21 through 27 are shown. In detail, the power factor improving circuit (an AC to DC converter circuit) is formed of a rectifying circuit, including diodes 21 through 24, and switching device 15. A DC to DC converter circuit (a DC to AC converter circuit+an AC to DC converter circuit) is formed of a converter circuit having a full-bridge structure and a rectifying and smoothing circuit including diodes 26, 27 and capacitor 5.

As switching device 15 in the power factor improving circuit turns ON while the voltage of the AC power supply 1 is positive, a current flows from AC power supply 1 to AC power supply 1 via diode 21, coil 2, switching device 15, and diode 24, increasing the current $i_2$ of coil 2. As switching device 15 turns OFF while the voltage of AC power supply 1 is positive, a current flows from coil 2 to coil 2 via diode 25, capacitor 4, diode 24, AC power supply 1 and diode 21, decreasing the current $i_2$ of coil 2. When the voltage of AC power supply 1 is negative, diodes 23 and 22 are electrically conductive in substitution for diodes 21 and 24, resulting in the similar operations as described above. Due to the above described operations of the power factor improving circuit, it is possible to control the current $i_2$ and the input current by changing the gate signal $v_{G15}$ for switching device 15 as described in FIG. 7. Therefore, it is possible not only to improve the input power factor and reduce the input current higher harmonics but also to obtain a DC voltage (the voltage of capacitor 4) from an AC input voltage.

In the DC to DC converter circuit described above, the voltage generated across capacitor 4 is applied to transformer 6 via switching devices 11 and 14, when switching devices 11 and 14 are ON, and rectified on the secondary side of transformer 6. Thus, a DC voltage (the voltage of capacitor 5), insulated from AC power supply 1, is obtained. In the same manner, as switching devices 13 and 12 turn ON, a negative voltage is applied to transformer 6 and an energy is fed to the secondary side thereof. When a high-frequency AC voltage is applied to a transformer, the method as described above, which converts a DC to an AC and further coverts the AC to a DC, is employed very often for reducing the transformer size.

It is necessary for the electric power converter circuit, as described in FIG. 6, to employ many constituent parts, causing problems for reducing the size, weight and manufacturing costs of the electric power converter circuit.

In view of the foregoing, it is an object of the invention to provide an electric power converter circuit that facilitates reducing the constituent parts, size, weight, and manufacturing costs thereof.

SUMMARY OF THE INVENTION

According to a first aspect of the present invention, there is provided an electric power converter circuit comprising a rectifying circuit including diodes, a coil, and a full-bridge circuit including switching devices; the rectifying circuit, the coil, and the full-bridge circuit being connected in cascade to an AC power supply, wherein the electric power converter circuit converts an AC electric power to a DC electric power, and further converts the converted DC electric power to an AC electric power. The electric power converter circuit comprises a series circuit including a diode and a switching device, the series circuit being connected between the DC output terminals of the full-bridge circuit; and one of the switching devices on the upper arm of the full-bridge circuit and one of the switching devices on the lower arm of the full-bridge circuit are made to be simultaneously ON for a certain period of time.

According to a second aspect of the invention, there is provided an electric power converter circuit comprising a rectifying circuit including diodes, a coil, and a full-bridge circuit including switching devices; the rectifying circuit, the coil, and the full-bridge circuit being connected in cascade to an AC power supply, wherein the electric power converter circuit converts an AC electric power to a DC electric power, and further converts the converted DC electric power to an AC electric power. The electric power converter circuit comprises a series circuit including a diode and a switching device, the series circuit being connected between the DC output terminals of the full-bridge circuit; and a plurality of the switching devices on the upper arm of the full-bridge circuit and a plurality of the switching devices on the lower arm of the full-bridge circuit are made to be simultaneously ON for a certain period of time.

In the electric power converter circuit described in the first aspect, any one of the switching devices constituting the full-bridge circuit may be replaced by a diode (third aspect).

In the electric power converter circuit described in the first aspect, one of the switching devices on the upper arm in the full-bridge circuit, one of the switching devices on the lower arm in the full-bridge circuit, and the switching device in the series circuit may be simultaneously ON for a certain period of time (fourth aspect).

Since the number of the constituent parts of the electric power converter circuit is reduced according to the invention, the electric power converter circuit according to the invention facilitates reducing the size, weight, and manufacturing costs thereof. According to the second aspect of the invention, the ON-resistance of the switching devices is halved and the conduction losses are reduced. Since one of the gate driver circuits is omitted according to the third aspect, the electric power converter circuit is obtained with lower manufacturing costs.

DETAILED DESCRIPTION OF PREFERRED EMBODIMENTS

Now the invention will be described in detail hereinafter with reference to the accompanied drawings which illustrate the preferred embodiments of the invention.

Figure 1:
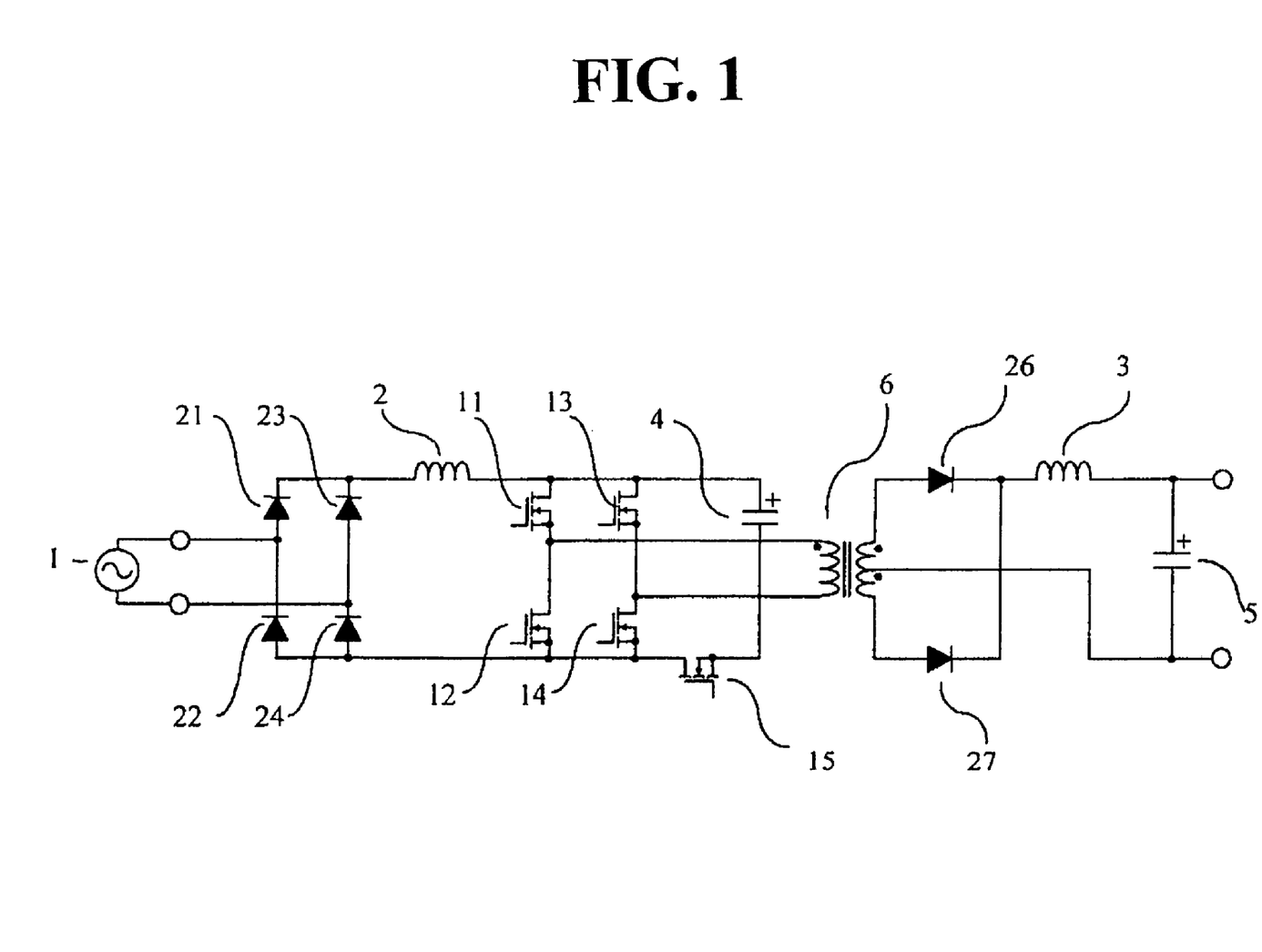
FIG. 1 is a block circuit diagram of an electric power converter circuit according to a first embodiment of the invention.

FIG. 1 is a block circuit diagram of an electric power converter circuit according to the first embodiment of the invention. The electric power converter circuit according to the first embodiment connects a series circuit consisting of capacitor 4 and switching device 15 between the DC terminals of the converter circuit having a full-bridge structure in the conventional electric power converter circuit and omits diode 25 from the conventional electric power converter circuit.

Figure 2:
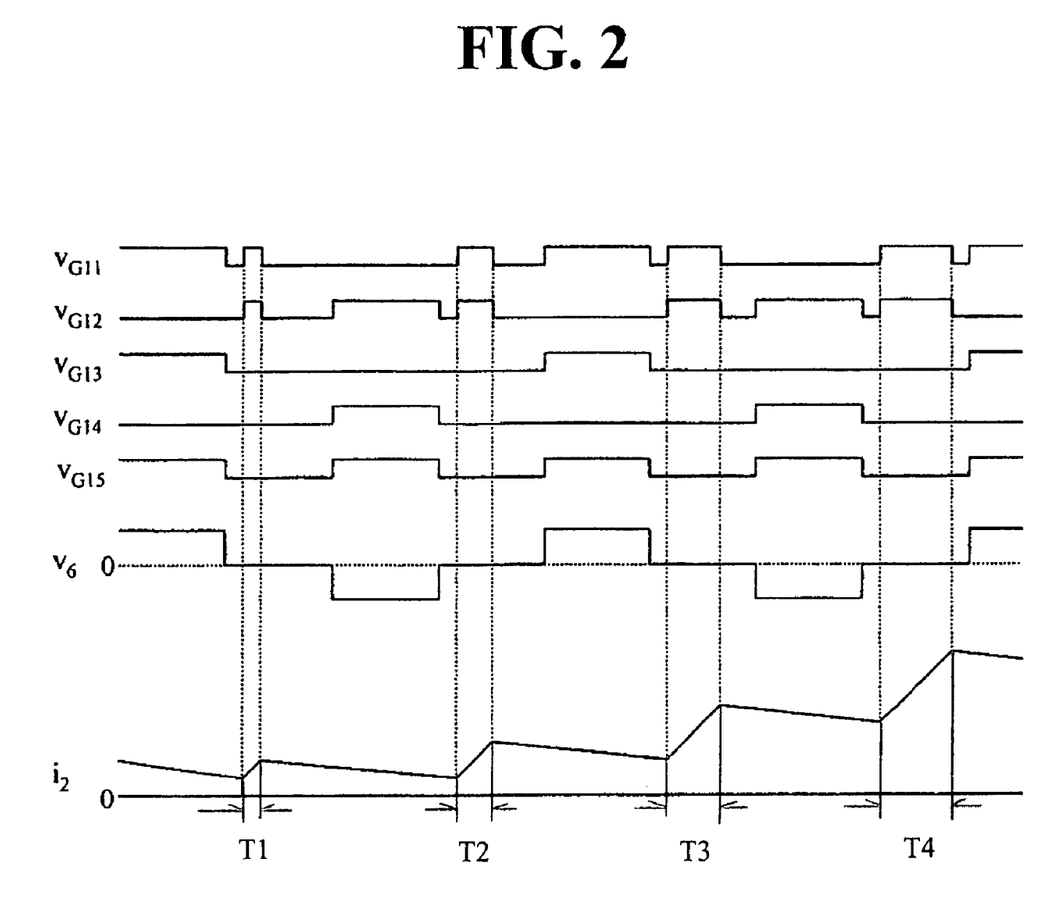
FIG. 2 is a wave chart describing the operations of the electric power converter circuit shown in FIG. 1.

In the FIG. 2, VG11 to VG15 are gate signals of the switching devices 11 to 15 in FIG. 1, and V6 is voltage generated on transformer 6.

In the circuit configuration described above, as switching devices 11 and 12 are turned ON while the voltage of AC power supply 1 is positive, a current flows from AC power supply 1 to AC power supply 1 via diode 21, coil 2, switching device 11, switching device 12, and diode 24, increasing the input current and the current $i_2$ of coil 2. As switching devices 11 and 12 are turned OFF while the voltage of power supply 1 is positive, a current flows from coil 2 to coil 2 via capacitor 4, the parasitic diode of switching device 15, diode 24, AC power supply 1, and diode 21, decreasing the input current and the current $i_2$ of coil 2.

When the voltage of AC power supply 1 is negative, diodes 23 and 22 are electrically conductive in substitution for diodes 21 and 24, resulting in the similar operations as described above. Therefore, by adjusting the period (T) where switching devices 11 and 12 are simultaneously ON, for example, such as $T_1$ to $T_4$ in FIG. 2, the input power factor which can control the input current is improved. Since a rectified voltage is obtained across capacitor 4, a DC voltage is obtained from an AC voltage.

In the DC to DC converter circuit, by turning ON the switching devices 11, 14, and 15, a voltage is applied to transformer 6 through the path circulating from capacitor 4 to capacitor 4 via switching device 11, transformer 6, switching device 14, and switching device 15. By turning ON switching devices 13, 12, and 15, a negative voltage is applied to transformer 6 through the path circulating from capacitor 4 to capacitor 4 via switching device 13, transformer 6, switching device 12, and switching device 15. The AC voltage generated across transformer 6 is rectified on the secondary side thereof and an insulated DC voltage is obtained across capacitor 5. Since diode 25 is omitted from the conventional electric power converter circuit, the electric power converter circuit according to the first embodiment facilitates reducing the size, weight, and manufacturing costs thereof.

Figure 3:
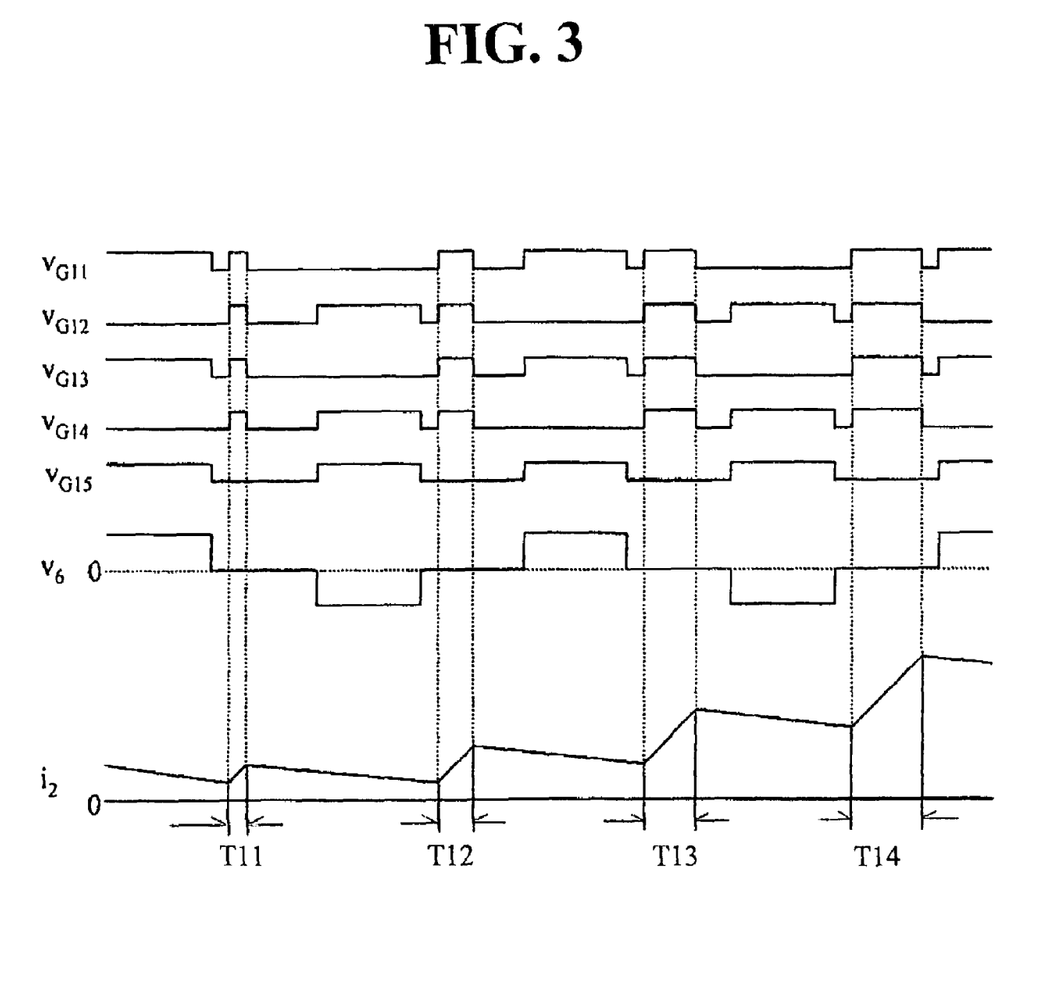
FIG. 3 is a wave chart describing the other operations of the electric power converter circuit shown in FIG. 1.

FIG. 3 is a wave chart describing the other operations of the electric power converter circuit shown in FIG. 1. In FIG. 3, the electric power converter circuit drives at the same time not only switching devices 11 and 12, such as $T_{11}$ to $T_{14}$ in FIG. 3, but also switching devices 13 and 14 to control the input current. By driving the switching devices as described above, the current increases through the circulating path from power supply 1 to power supply 1 via diode 21 or 23, switching devices 11 and 12 as well as switching devices 13 and 14, and diode 24 or 22. Therefore, the ON-resistance of switching devices 11 through 14 is half the ON-resistance caused by operating the electric power converter circuit as described in FIG. 2. Thus, it is possible to reduce the conduction losses.

Figure 4:
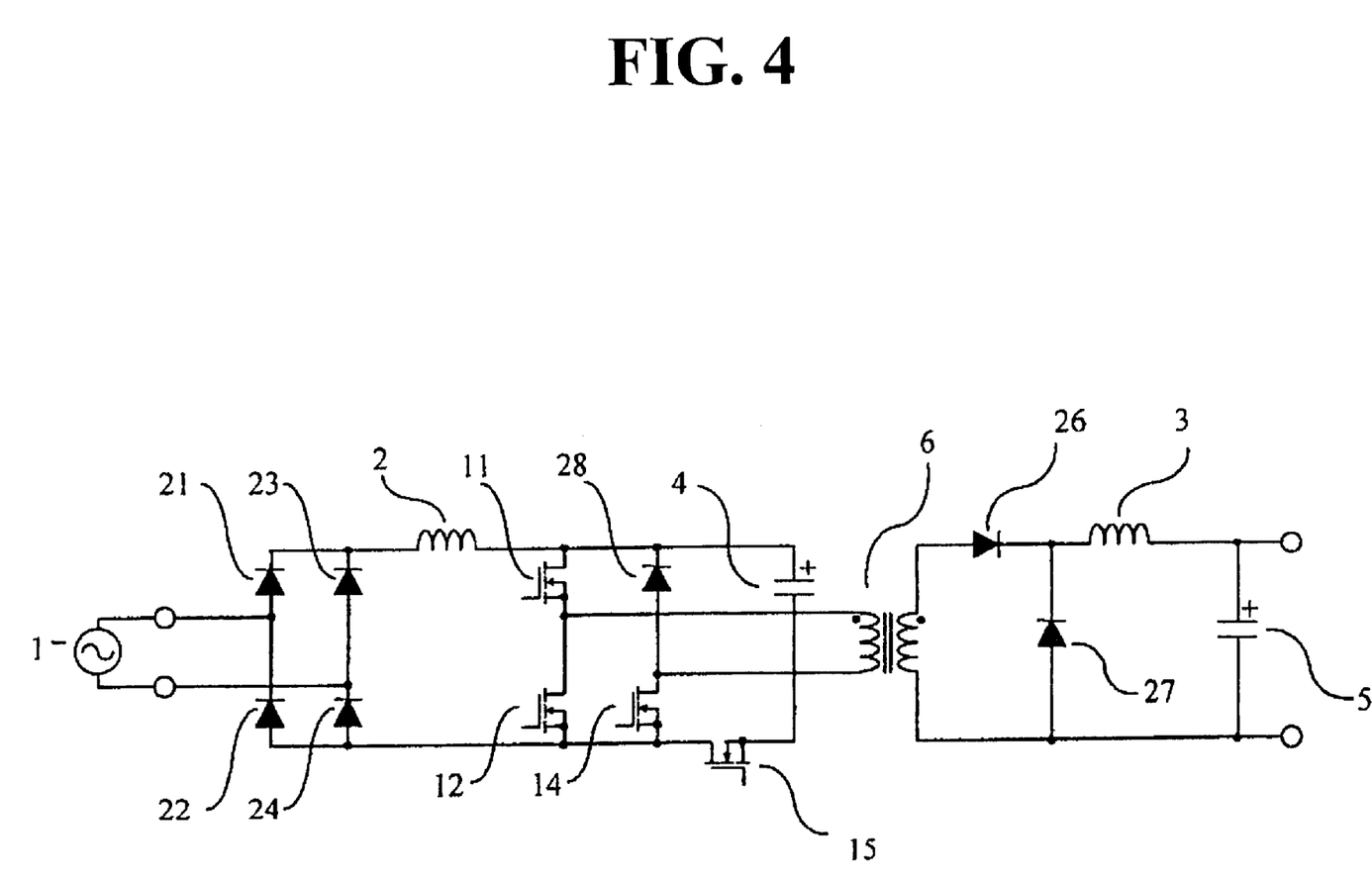
FIG. 4 is a block circuit diagram of an electric power converter circuit according to a second embodiment of the invention.
Figure 5:
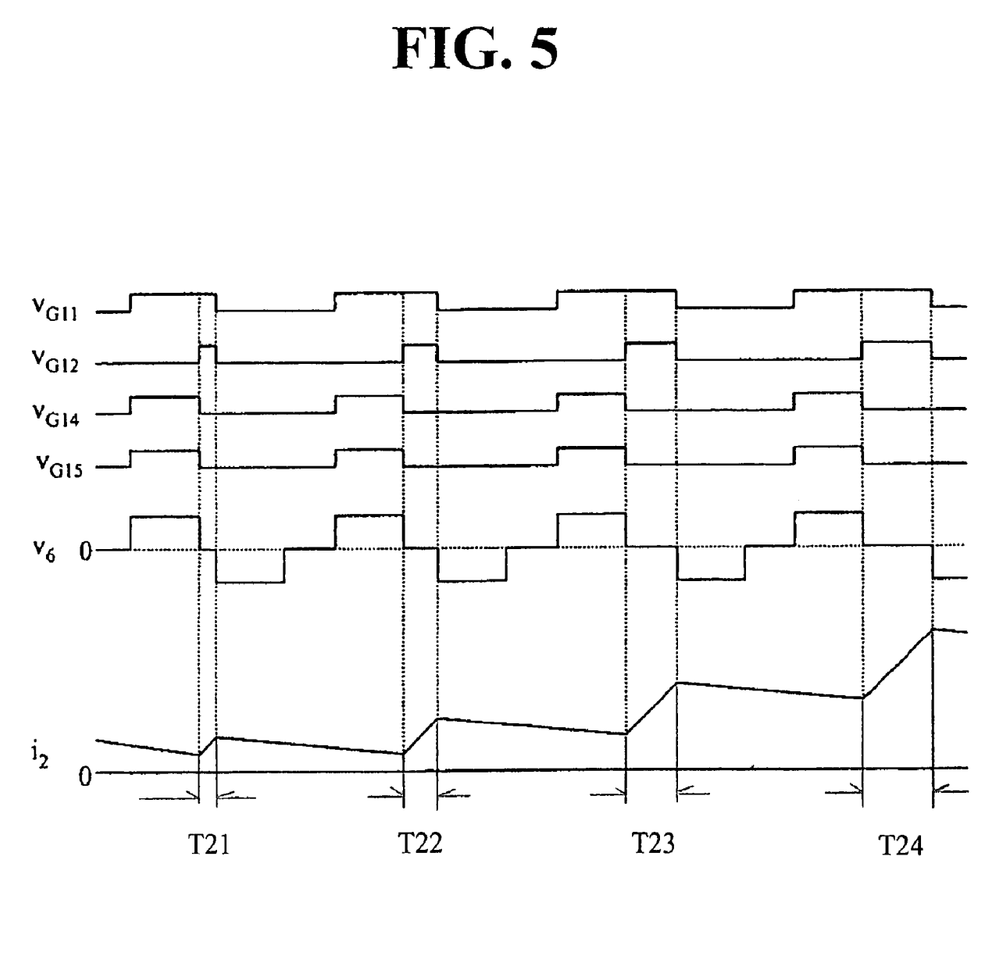
FIG. 5 is a wave chart describing the operations of the electric power converter circuit shown in FIG. 4.

FIG. 4 is a block circuit diagram of an electric power converter circuit according to the second embodiment of the invention. FIG. 5 is a wave chart describing the operations of the electric power converter circuit shown in FIG. 4.

Referring now to FIG. 4, switching device 13 in FIG. 1 is replaced by a diode 28 in FIG. 4. The electric power converter circuit according to the second embodiment that employs a diode less expansive than the switching device facilitates omitting the gate driver circuit and reducing the size, weight, and manufacturing costs thereof. In FIG. 4, switching device 13 constituting the bridge is replaced by diode 28. Alternatively, any one of switching devices 11, 12 and 14 may be replaced by diode 28 without problem.

The power factor improving circuit in FIG. 4 operates in the same manner as the power factor improving circuit in FIG. 1 and facilitates improving the input power factor and obtaining a DC voltage across capacitor 4. The DC to DC converter circuit turns ON switching devices 11, 14 and 15, such as $T_{21}$ to $T_{24}$ in FIG. 5, to apply the voltage of capacitor 4 to transformer 6 via the path circulating from capacitor 4 to capacitor 4 via switching device 11, transformer 6, switching device 14, and switching device 15. By turning OFF the switching devices 11, 14 and 15, the excitation energy of transformer 6 is regenerated from transformer 6 to transformer 6 via diode 28, capacitor 4, the parasitic diode of switching device 15, and the parasitic diode of switching device 12, resetting transformer 6. While switching deices 11, 14 and 15 are ON, an energy is fed from the primary side to the secondary side of transformer 6 and an insulated DC voltage is obtained across capacitor 5.

The disclosure of Japanese Patent Application No. 2005-283756 filed on Sep. 29, 2005 is incorporated as a reference.

While the invention has been explained with reference to the specific embodiments of the invention, the explanation is illustrative, and the invention is limited only by the appended claims.

What is claimed is:

1. An electric power converter circuit, comprising:
  a rectifying circuit including diodes, a coil, and a full-bridge circuit including switching devices; the rectifying circuit, the coil, and the full-bridge circuit being connected in cascade to an AC power supply; the electric power converter circuit converting an AC electric power to a DC electric power and further converting the converted DC electric power to an AC electric power, and
  a series circuit consisting of a capacitor and another switching device, the series circuit being connected between DC output terminals of the full-bridge circuit,
  wherein a first switching device on an upper arm of the full-bridge circuit and a second switching device on a lower arm of the full-bridge circuit are made to be simultaneously ON for a first period of time, and the first switching device is coupled in series with the second switching device.

2. The electric power converter circuit according to claim 1, wherein one of the switching devices constituting the full-bridge circuit is replaced by a diode.

3. The electric power converter circuit according to claim 1, wherein one of the switching devices on the upper arm in the full-bridge circuit, one of the switching devices on the lower arm in the full-bridge circuit, and the switching device in the series circuit are simultaneously ON for a second period of time.

4. The electric power converter circuit according to claim 1, wherein the coil is only disposed between the rectifying circuit and the full-bridge circuit.

5. The electric power converter circuit according to claim 1, wherein the switching devices of the full bridge circuit are turned OFF simultaneously for a third period of time after the first period of time.

6. The electric power converter circuit according to claim 5, wherein the capacitor is an electrolytic capacitor.

7. The electric power converter circuit according to claim 1, wherein the rectifying circuit and the full-bridge circuit are arranged without having a main switch for increasing a current flow on the coil coupled in parallel therewith.

8. An electric power converter circuit, comprising:
a rectifying circuit including diodes, a coil, and a full-bridge circuit including switching devices; the rectifying circuit, the coil, and the full-bridge circuit being connected in cascade to an AC power supply; the electric power converter circuit converting an AC electric power to a DC electric power and further converting the converted DC electric power to an AC electric power, and
a series circuit consisting of a capacitor and another switching device, the series circuit being connected between DC output terminals of the full-bridge circuit,
wherein a plurality of the switching devices on an upper arm of the full-bridge circuit and a plurality of the switching devices on a lower arm of the full-bridge circuit are made to be simultaneously ON for a first period of time in order to increase a current on the coil, and at least one of the plurality of the switching devices on the upper arm is coupled in series with at least one of the plurality of the switching devices on the lower arm.

9. The electric power converter circuit according to claim 8, wherein the switching devices of the full bridge circuit are turned OFF simultaneously for a third period of time after the first period of time.

10. The electric power converter circuit according to claim 9, wherein the capacitor is an electrolytic capacitor.

11. The electric power converter circuit according to claim 8, wherein the coil is only disposed between the rectifying circuit and the full-bridge circuit.

12. The electric power converter circuit according to claim 8, wherein the rectifying circuit and the full-bridge circuit are arranged without having a main switch for increasing a current flow on the coil coupled in parallel therewith.

* * * * *